Patented Sept. 9, 1952

2,610,199

UNITED STATES PATENT OFFICE 2,610,199

ORGANOSILYL ACYL HALIDES

Leo Harry Sommer, State College, Pa., assignor to Dow Corning Corporation, Midland, Mich., a corporation of Michigan No Drawing. Application April 13, 1950, Serial No. 155,782

5 Claims. (Cl. 260—448.2)

The present invention relates to acyl halides which are omega-substituted with triorganosilyl radicals and to their production.

Compounds in accordance herewith are of the general formula R(CH₃)₂Si(CH₂)ₙCOX where R represents methyl or phenyl, n has an average value of from 2 to 5, inclusive, and X represents a halogen, preferably chlorine or bromine. In accordance herewith, these compounds may be prepared by halogenating the equivalent acids, which are of the general formula

Conventional methods of organic chemistry may be employed for this halogenation, such as are employed in organic synthesis in the conversion of carboxy acids to acyl halides.

In the following description of methods for the preparation of raw materials, the terms "triorganosilyl" and "triorganosilane" are employed to refer collectively to trimethylsilyl and phenyldimethylsilyl, and trimethylsilane and phenyldimethylsilane, respectively.

The triorganosilyl-substituted propionic to hexoic acids which are employed in the process hereof may be prepared as follows:

For the preparation of the silyl-substituted propionic acid, chloromethyltrimethylsilane and chloromethyldimethylphenylsilane may be employed as raw materials. These two raw materials are described in the literature. These chloromethylsilanes may be subjected to the malonic ester synthesis, which is a general synthetic method known in organic chemistry. As applied to the present synthesis, the chloromethylsilane is reacted with an equivalent weight of the sodium salt of diethyl malonate. The reaction product is saponified, hydrolyzed, and decarboxylated, as is known in this type of synthesis. The product is the omega-triorganosilylpropionic acid.

To prepare the triorganosilylbutyric acid, the chloromethylsilanes may be reacted with an equivalent weight of magnesium in diethyl ether to prepare the Grignard reagent. This may be reacted with ethylene oxide. By this method there is obtained the omega-triorganosilylpropanol. This substituted propanol may be converted by reacting it with an equivalent weight of phosphorous tribromide to the omega-triorganosilylpropyl bromide. This substituted propyl bromide may be reacted with an equivalent weight of magnesium in diethyl ether to prepare the equivalent Grignard reagent. This Grignard reagent is then reacted with carbon dioxide, as by pouring it on solid carbon dioxide, to form a complex which upon hydrolysis with water yields the triorganosilylbutyric acid.

The triorganosilylvaleric acid may be prepared from the triorganosilylpropyl bromide prepared as above described. When the malonic ester synthesis above described is employed with this substituted propyl bromide, the triorganosilylvaleric acid is obtained.

The omega-triorganosilylhexoic acid may be prepared from the above-described triorganosilylpropyl bromide by preparing a Grignard reagent of this bromide and reacting this Grignard reagent with ethylene oxide. By this method the omega-substituted triorganosilylamyl alcohol is produced. This may be converted to the bromide by reacting it with an equivalent weight of thionyl bromide. A Grignard reagent is prepared from this substituted amyl bromide, which Grignard reagent is then reacted with carbon dioxide by the method above stated to yield a complex, which upon hydrolysis with water produces the omega-triorganosilylhexoic acid.

In accordance with the method hereof, the acyl halide hereof is obtained from these carboxylic acids by reacting the acids with conventional halogenating agents such as thionyl chloride, benzoyl chloride, phosphorous trichloride, or the corresponding bromides.

By mixing the various acyl halide compounds hereof, compositions may be obtained in which the average value of n is fractional and not a whole number.

The products hereof find their principal utility as chemical intermediates for the production of other products of direct utility. Thus, the acyl halides hereof may be converted by standard procedures through the corresponding amides to the amines. These amines are of extensive utility in the form of their quaternary salts as thermally decomposable emulsifying agents for siloxane fluids, such as dimethylpolysiloxane.

Example 1

Beta-trimethylsilylpropionyl chloride was prepared as follows:

The sodium salt of diethyl malonate was prepared from sodium ethylate using 200 grams of sodium and from 790 grams of diethyl malonate. The alcoholic solution of the sodium salt was clear and yellow. This sodium salt was reacted with 514.5 grams of chloromethyltrimethylsilane, which was added gradually with the reaction mixture being heated under reflux. This reaction product was saponified by the addition of 561 grams of potassium hydroxide dissolved in 570 cc.

of water, the saponification being effected at room temperature, following which the reaction mixture was refluxed for two and one-half hours. Ethanol was removed by distillation. The potassium salt so formed was hydrolyzed by the addition of one liter of concentrated hydrochloric acid. Reaction mixture was stirred under reflux for five hours, whereby trimethylsilylpropionic acid was formed as an upper layer. This acid boils at 90.5° C. at a pressure of 37 mm. mercury and has a refractive index of $n_D^{20}$ equal to 1.4192.

The beta-trimethylsilylpropionic acid, in amount of 120 grams, was added gradually with stirring to 150 grams of thionyl chloride. The reaction mixture was maintained at 80° C. for three hours and at 95° C. for three hours, following which it was fractionally distilled. The product, beta-trimethylsilylpropionyl chloride, was obtained as a fraction boiling at 92° C. at a pressure of 65 mm. mercury. The refractive index was $n_D^{20}$ equal to 1.4379.

*Example 2*

When one mole of beta-trimethylsilylpropionic acid is added to one mole of phosphorous tribromide at room temperature and then heated gradually, a reaction mixture is produced from which beta-trimethylsilylpropionyl bromide may be separated by fractional distillation.

*Example 3*

Beta-phenyldimethylsilylpropionyl chloride was prepared as follows:

Beta-phenyldimethylsilylpropionic acid was prepared by the method described in Example 1, with the substitution of chloromethylphenyldimethylsilane for the chloromethyltrimethylsilane there employed. 24 grams of the beta-phenyldimethylsilylpropionic acid were heated in mixture with 59 grams of thionyl chloride at 90° C. for two hours. The reaction product was fractionally distilled, whereby the desired product, beta-phenyldimethylsilylpropionyl chloride, was obtained, which had a boiling point of 114° C. at a pressure of 3 mm. mercury, a refractive index of $n_D^{20}$ equal to 1.5188, and a density at 20° C. of 1.0664.

*Example 4*

Gamma-trimethylsilylbutyryl chloride was prepared as follows:

Chloromethyltrimethylsilane, in amount of 6.8 grams, was mixed with 32.6 grams of magnesium and 25 ml. of diethyl ether. One crystal of iodine was added. When the reaction had started, 184 grams of chlormethyltrimethylsilane dissolved in 550 ml. of diethyl ether was added. The solution was stirred for two hours at 100° C. The solution was cooled to approximately —10° C., whereupon 100 ml. of ethylene oxide dissolved in 125 ml. of diethyl ether were added. The temperature of the mixture was allowed to rise gradually. The ether was distilled from the reaction mixture and replaced with 750 ml. of benzene. The solution was poured onto one liter of cracked ice, and 250 ml. of concentrated hydrochloric were added. The benzene layer was fractionated, whereby gamma-trimethylsilylpropanol was obtained, which has a boiling point of 62° C. at a pressure of 6.2 mm. mercury. Two moles of this product were mixed with one mole of phosphorous tribromide at 0° C. and allowed to stand for 1.5 hours. The reaction mixture was heated to 85° C. and held at that temperature for nine hours. Excess phosphorous tribromide was decomposed with water. The residue was fractionated, whereby gamma-trimethylsilylpropyl bromide was obtained, which had a boiling point of 67.5° C. at a pressure of 21 mm. mercury. 57.5 grams of this bromide were reacted with 38 grams of magnesium in 100 ml. of diethyl ether and in the presence of one crystal of iodine. When the reaction had started, an additional 500 ml. of the ether and 235 grams of the bromide were added. The mixture was heated under reflux for fifteen hours. The product was poured onto 1500 grams of solid carbon dioxide. A solution of 140 ml. of concentrated hydrochloric acid in one liter of water was added to hydrolyze the product. The product was distilled, whereby $(CH_3)_3Si(CH_2)_3COOH$ was obtained, which had a boiling point of 117.8° C. at a pressure of 100 mm. mercury.

The substituted butyric acid so prepared, in amount of 128 grams, was added gradually at 0° C. to 95 ml. of thionyl chloride. During twenty hours the temperature was gradually raised to 90° C. The reaction product was fractionally distilled, whereby gamma-trimethylsilylbutyryl chloride was obtained, which had a boiling point of 105° C. at a pressure of 57 mm. mercury and a refractive index of $n_D^{20}$ equal to 1.4381. The density at 20° C. was 0.9464.

That which is claimed is:

1. Compositions of the general formula $$R(CH_3)_2Si(CH_2)_nCOCl$$

in which R represents a radical of the group consisting of methyl and phenyl and $n$ has an average value of from 2 to 5, inclusive.

2. Compositions of the general formula $$(CH_3)_3Si(CH_2)_nCOCl$$

in which $n$ has an average value of from 2 to 5, inclusive.

3. $(CH_3)_3Si(CH_2)_2COCl$.
4. $(CH_3)_3Si(CH_2)_3COCl$.
5. $C_6H_5(CH_3)_2Si(CH_2)_2COCl$.

LEO HARRY SOMMER.

REFERENCES CITED

The following references are of record in the file of this patent:

Sommer et al.: Jour. Am. Chem. Soc., vol. 71, p. 1509 (1949).

Sommer et al.: Jour. Am. Chem. Soc., vol. 72, pp. 1935–39 (1950).